Feb. 10, 1948.                  J. R. HUBER                     2,435,651
                          FENCE POST DRIVING DEVICE
                    Filed Nov. 1, 1946        2 Sheets-Sheet 1
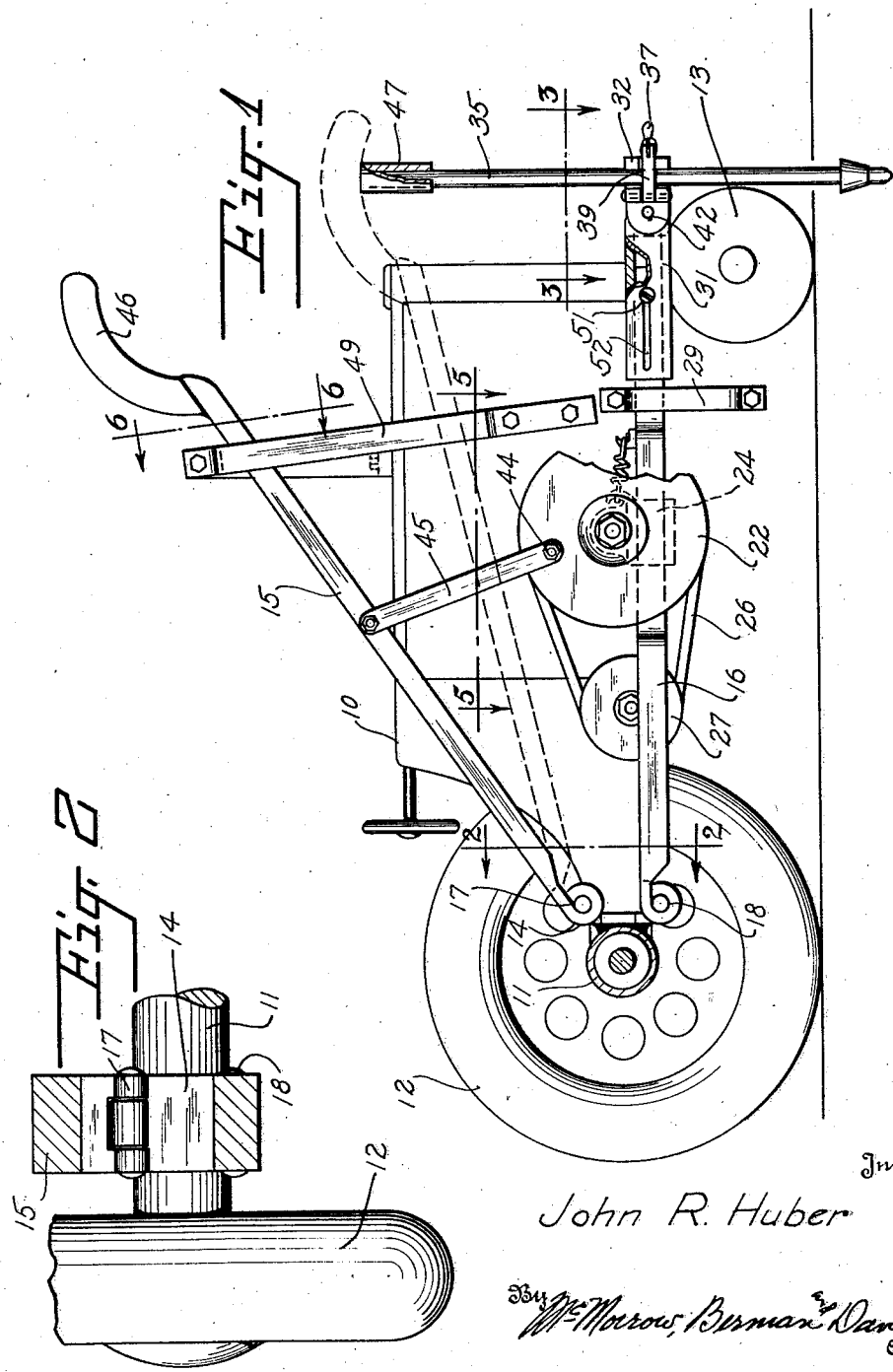
Inventor
John R. Huber Feb. 10, 1948.   J. R. HUBER   2,435,651
FENCE POST DRIVING DEVICE
Filed Nov. 1, 1946   2 Sheets-Sheet 2

Inventor
John R. Huber
By McMorrow, Berman & Davidson
Attorneys

Patented Feb. 10, 1948

2,435,651

UNITED STATES PATENT OFFICE 2,435,651

FENCE POST DRIVING DEVICE

John R. Huber, Williamsfield, Ill.

Application November 1, 1946, Serial No. 707,082

3 Claims. (Cl. 61—74)

This invention relates to a fence post driving device and more particularly to a driving device adapted for attachment to a tractor to be transported by the same into the location where the post is to be driven.

It is an object of the present invention to provide a tractor mounted post driving device adapted for easy attachment to the tractor and to be driven by the power takeoff of the tractor.

It is another object of the invention to provide a tractor mounted post driving device to which the post can be easily secured and attached so as to be guided during its descent into the ground and wherein the parts are so constructed and hinged to one another that as the post is driven they will be adapted to retain the post in a vertical position while effecting a driving action upon the top of the post.

It is another object of the present invention to provide a tractor mounted post driving device which is of simple construction, requires minimum parts to build, efficient in operation and easy to assemble to the tractor.

For other objects and for a better understanding of the invention reference may be had to the following detailed description taken in connection with the accompanying drawing, in which:

Figure 1 is a side elevational view of a tractor and of the power driven post driving device assembled thereon and broken away in places to more clearly show the interior of certain of the parts.

Figure 2 is an enlarged fragmentary and cross sectional view taken on line 2—2 of Figure 1 and looking in the direction of the arrows thereof and upon the front of the plate to which the driving and the post supporting members are hinged.

Figure 3:
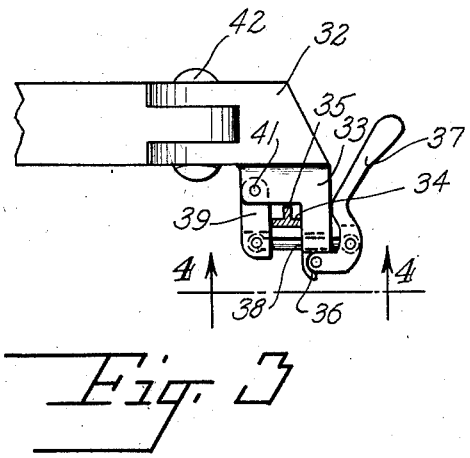
Figure 3 is a fragmentary and detail view looking in plan upon the forward end of the post supporting device and showing the clamping parts adapted to be secured about the post.
Figure 4:
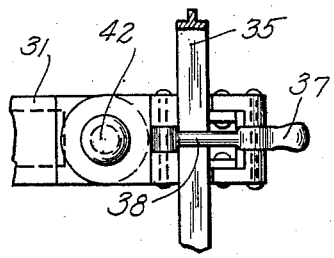
Figure 4 is an elevational view of the forward end of the post supporting member and looking upon the clamping parts in the direction of the arrows 4—4 of Figure 3.
Figure 5:
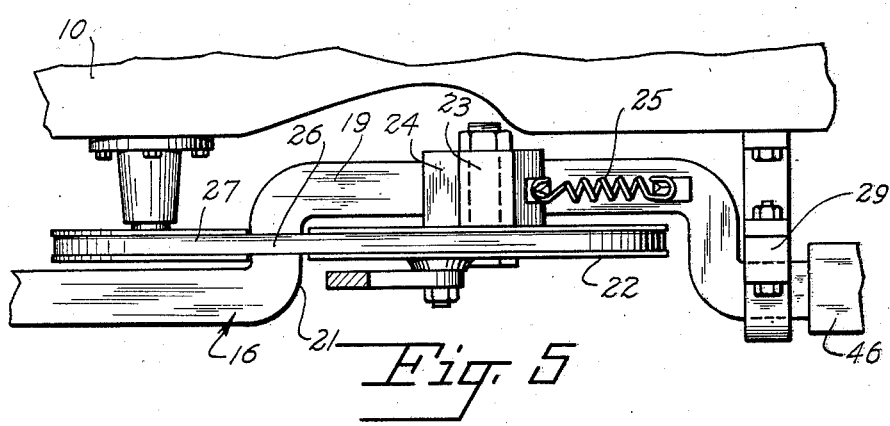
Figure 5 is a fragmentary plan view looking down upon the power operating parts of the device and as taken on line 5—5 of Figure 1.
Figure 6:
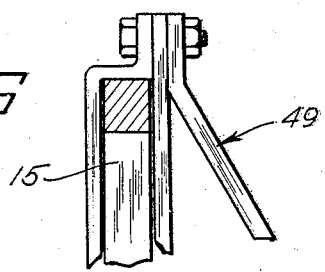
Figure 6 is an enlarged fragmentary view of the top end of the guiding bracket for the driving member with the driving member in place and in section, the view being taken on line 6—6 of Figure 1 and looking in the direction of the arrows thereof.

Referring now to the figures, 10 represents a tractor having a rear axle structure 11 and a rear wheel 12 thereon. The front of the tractor is supported upon a dirigible wheel 13. Upon the rear axle structure 11 and at the front thereof there is secured as by welding a bracket 14 to which the rearward ends of a driving member 15 and a post supporting member 16 are hinged for vertical pivotal movement as indicated respectively at 17 and 18. The member 16 is depressed inwardly intermediate its length as indicated at 19 to provide a recess 21 for receiving a pulley driven wheel crank 22 having a supporting shaft 23 journaled in a bearing bracket 24 on the top of the depressed portion 19 of the member 16. The bearing bracket 24 is slidably connected to the portion 19 and is urged outwardly at all times by a tension spring 25. In the outer periphery of the wheel crank 22 is a recess for receiving a V-belt pulley 26 connected to a driving pulley 27 carried on the tractor 10 and providing the power takeoff for the same.

Extending outwardly from the side of the tractor is a guide bracket structure 29 through which the post supporting member 16 is extended and adapted to be guided in its vertical pivotal movement about its hinge point 18. Telescopically connected to the outer end of the member 16 is a sleeve 31 on which is hinged for vertical movement a clamping member 32 having an angled portion 33 with a recess 34 for receiving a post 35 to be driven. The angled portion 33 has an extension 36 on which there is pivoted a hand lever 37 and through which there is extended a shaft 38 coupled with the other end of a clamping part 39 pivoted to the angled portion 33 at 41. As the hand member 37 is moved outwardly the shaft 38 will be moved outwardly through the extension 36 to permit the rearward pivotal movement of the clamping part 39 whereby to make it possible for the post to be extended into the recess 34 of the angled portion. It will be noted that the clamping part 32 is hinged for vertical pivotal movement as indicated by a laterally extending hinge pin 42 whereby to permit the clamping part 32 to be pivoted upwardly to a vertical position so that the fence post can be inserted into the recess 34 from a horizontal direction and then pivoted downwardly into its location on the ground by bringing the clamping part 32 again to its horizontal position.

Extending laterally from the wheel crank 22 is a crank pin 44 to which a connecting rod 45 extending from the post driving member 15 is connected. As the wheel crank 22 is rotated, the post driving member 15 is given downward and upward movement. The end of the post driving member 15 has a flattened head portion 46 adapted to engage with a cap 47 on the top end of the post 35. The engagement with the cap 47 is effected when the crank pin 44 is in its low point location. The upward and downward movement of the post driving member 15 will continue until the post has been driven into the ground to the desired extent. The cap 47 will be removed from the post after the post has been driven. This cap thus protects the top of the post while it is being driven. The post driving member 15 should be made of strong spring steel to withstand the shock.

On the side and top of the tractor is a vertically extending guiding bracket structure 49 for guiding the post driving member 15. The sleeve 31 is limited in its outward movement by the engagement of a screw 51 with the rear end of a slot 52. Adequate sliding movement is permitted to permit the adaptation of the clamping element 32 upon the fence post 35 and the locating of the fence post in the proper position on the ground. Preferably the engaging end of the handle portion with the extension 36 is such that it can be released therefrom to permit the outward swinging movement of the shaft 38 so that the clamping elements 32 and 39 can be readily moved laterally out of engagement with the side of the post.

While various changes may be made in the detail construction it shall be understood that such changes shall be within the spirit and scope of the present invention as defined by the appended claims.

What is claimed is:

1. A tractor mounted post driving device comprising a bracket adapted to be connected to the rear axle structure of a tractor, a post supporting bar hinged to the lower portion of the bracket and extending forwardly along the side of the tractor, a post driving member pivoted to the bracket above the post supporting member, guiding bracket means secured to the side of the tractor for guiding the vertical pivotal movement of the respective members, said post supporting member having means on its outer end adapted to be releasably connected to a post, a crank pivoted upon the post supporting member, a connecting rod extending between the crank and the post driving member whereby as the crank is rotated the driving member will be brought to bear against the top of the post held by the post supporting member, and drive means extending from the crank and adapted for connection with the power takeoff of the tractor whereby the rotation of the crank will be effected.

2. A tractor mounted post driving device comprising a bracket adapted to be connected to the rear axle structure of a tractor, a post supporting bar hinged to the lower portion of the bracket and extending forwardly along the side of the tractor, a post driving member pivoted to the bracket above the post supporting member, guiding bracket means secured to the side of the tractor for guiding the vertical pivotal movement of the respective members, said post supporting member having means on its outer end adapted to be releasably connected to a post, a crank pivoted upon the post supporting member, a connecting rod extending between the crank and the post driving member whereby as the crank is rotated the driving member will be brought to bear against the top of the post held by the post supporting member, and drive means extending from the crank and adapted for connection with the power takeoff of the tractor whereby the rotation of the crank will be effected, said releasable clamping means on the outer end of the post supporting member being hingedly connected to the end of the post supporting member for vertical pivotal movement whereby the clamping means can be moved to a vertical position to permit the insertion of a post into the clamping means from a horizontal direction and also to permit the post to remain straight as the outer end of the post supporting member moves downwardly, a slide on the end of the post supporting member, and said releasable clamping means being secured or hinged to the other end of the slide.

3. A tractor mounted post driving device comprising a bracket adapted to be connected to the rear axle structure of a tractor, a post supporting bar hinged to the lower portion of the bracket and extending forwardly along the side of the tractor, a post driving member pivoted to the bracket above the post supporting member, guiding bracket means secured to the side of the tractor for guiding the vertical pivotal movement of the respective members, said post supporting member having means on its outer end adapted to be releasably connected to a post, a crank pivoted upon the post supporting member, a connecting rod extending between the crank and the post driving member whereby as the crank is rotated the driving member will be brought to bear against the top of the post held by the post supporting member, and drive means extending from the crank and adapted for connection with the power takeoff of the tractor whereby the rotation of the crank will be effected, said post supporting member being depressed intermediate its length and providing a recess in one side thereof, said crank being in the form of a wheel with the provision of a crank pin thereon, a journal bearing slidably attached to the depressed portion of the post supporting member and said crank wheel journaled in the bearing portion and extending downwardly through the side recess of the post supporting member, said drive means including a pulley belt extending over the crank wheel and over the power takeoff of the tractor, and a spring connected to the journal bracket to urge the same outwardly along the depressed portion of the post supporting member whereby to maintain at all times a tension upon the pulley belt.

JOHN R. HUBER.